(12) United States Patent
Danell et al.

(10) Patent No.: US 11,223,298 B2
(45) Date of Patent: Jan. 11, 2022

(54) ULTRASONIC RESONATING MOTOR

(71) Applicant: PIEZOMOTOR UPPSALA AB, Uppsala (SE)

(72) Inventors: Andreas Danell, Vattholma (SE); Stefan Johansson, Uppsala (SE); Jan Söderkvist, Täby (SE)

(73) Assignee: PIEZOMOTOR UPPSALA AB, Uppsala (SE)

( * ) Notice: Subject to any disclaimer, the term of this patent is extended or adjusted under 35 U.S.C. 154(b) by 159 days.

(21) Appl. No.: 16/639,283

(22) PCT Filed: Aug. 15, 2018

(86) PCT No.: PCT/SE2018/050826
§ 371 (c)(1),
(2) Date: Feb. 14, 2020

(87) PCT Pub. No.: WO2019/035757
PCT Pub. Date: Feb. 21, 2019

(65) Prior Publication Data
US 2020/0266729 A1    Aug. 20, 2020

(30) Foreign Application Priority Data
Aug. 16, 2017    (SE) .................... 1750994-4

(51) Int. Cl.
*H02N 2/00* (2006.01)
*H02N 2/02* (2006.01)
*H02N 2/10* (2006.01)

(52) U.S. Cl.
CPC ......... *H02N 2/0015* (2013.01); *H02N 2/0055* (2013.01); *H02N 2/026* (2013.01); *H02N 2/103* (2013.01); *H02N 2/0065* (2013.01)

(58) Field of Classification Search
CPC .... H02N 2/0015; H02N 2/0055; H02N 2/026; H02N 2/103; H02N 2/0065; H02N 2/0025
See application file for complete search history.

(56) References Cited

U.S. PATENT DOCUMENTS 6,882,084 B2 * 4/2005 Johansson ............ H02N 2/0015
310/323.02
8,013,496 B2   9/2011 Kang et al.
(Continued)

FOREIGN PATENT DOCUMENTS

CN      203039613    7/2013
EP      2161767 A2   3/2010
(Continued)

OTHER PUBLICATIONS

The Extended European Search Report for European Patent ApplicationNo. 18845504.2-1212 dated Mar. 22, 2021, 8 pages.
(Continued)

*Primary Examiner* — Emily P Pham
(74) *Attorney, Agent, or Firm* — Nixon & Vanderhye

(57) ABSTRACT

An ultrasonic electromechanical stator includes two vibration bodies, a link member connecting the two vibration bodies along a connection direction and a stator support. Each of the vibration bodies includes a respective electromechanical element and is configured to perform bending vibrations in a bending direction when an alternating voltage is applied to the electromechanical elements. The link member has a contact portion intended for contacting a surface of a body to be moved. The link member has a respective mechanical link connecting portion to the vibrating bodies. Each of the vibration bodies is mechanically attached to the stator support by at least two attachment tabs on at least one side, in a direction transverse to both the connection direction and the bending direction, of the respective vibration (Continued)

bodies. Also an ultrasonic electromechanical motor having such an ultrasonic electromechanical stator is disclosed.

22 Claims, 7 Drawing Sheets

(56) References Cited

U.S. PATENT DOCUMENTS

| | | |
|---|---|---|
| 2003/0052573 A1 | 3/2003 | Wischnewskty |
| 2003/0234596 A1 | 12/2003 | Johansson et al. |
| 2005/0073219 A1 | 4/2005 | Johansson |
| 2011/0025169 A1 | 2/2011 | Haussecker et al. |
| 2013/0278112 A1 | 10/2013 | Yokoyama |
| 2016/0164436 A1 | 6/2016 | Nishitani |

FOREIGN PATENT DOCUMENTS

| | | |
|---|---|---|
| EP | 2161767 A3 | 4/2010 |
| WO | WO2004/112232 | 12/2004 |
| WO | WO2005/031888 | 4/2005 |
| WO | WO 2009/106412 | 9/2009 |

OTHER PUBLICATIONS

International Search Report, PCT/SE2018/050826, dated Sep. 27, 2018.

* cited by examiner

ULTRASONIC RESONATING MOTOR

TECHNICAL FIELD

The proposed technology generally relates to electromechanical motors, and in particular to electromechanical motors utilizing vibrating elements comprising electromechanical material, vibrating in the ultrasound area and methods for driving such motors.

BACKGROUND

Electromechanical driving elements have in prior art been used for many types of miniature motor applications. A large portion of these motors are based on ultrasonic operation of the electromechanical driving elements. Typical examples of electromechanical materials are piezoelectric, electrostrictive and antiferroelectric materials and these materials could be single crystalline as well as polycrystalline or amorphous.

Piezoelectric materials are popular to use due to the relative simplicity in activation of the piezoelectric effect. Many different designs are available. In the PiezoWave® motor, a piezoelectric bar is put into resonance. A drive pad on the bar is in contact with a body to be moved, and the motion of the drive pad is transferred into a moving action relative the body to be moved. This is a compact solution that has been advantageously used in many types of applications. However, one minor drawback of this approach is that the motor is limited in the amount of preload that the piezo element can handle. A too high preload will increase the risk for breaking the element. This might limit the available output force.

In the published international patent applications WO2004/112232 and WO2005/031888 A1, motors that comprise piezo elements that create vibration of a sheet metal through a less rigid portion are disclosed. This connecting portion thus works as a link between the resonators and may by proper designs withstand high preloads without involving the piezo elements.

There are also numerous of other designs using links between vibrating elements, e.g. as disclosed in US 2011/0025169 A1, CN 203039613 U or U.S. Pat. No. 8,013,496 B2

The piezo elements can be put in phase-shifted vibrations, which are used to cause the central link section to have an elliptical trajectory. The amplitude of this trajectory, both in driving direction and lifting direction, as well as the force by which the link can drive a body is, however, typically influenced by many different design and/or operation parameters. It has been difficult to find configurations that are reproducible, robust and controllable and that at the same time provide high forces or high speed or a low power consumption.

SUMMARY

A general object is to improve the robustness of operation of ultrasonic electromechanical motors with links between vibrating bodies.

The above object is achieved by methods and devices according to the independent claims. Preferred embodiments are defined in dependent claims.

In general words, in a first aspect, an ultrasonic electromechanical stator comprises two vibration bodies, a link member connecting the two vibration bodies along a connection direction and a stator support. Each of the vibration bodies comprises a respective electromechanical element. Each of the vibration bodies is configured to perform bending vibrations in a bending direction, transverse to the connection direction, when an alternating voltage is applied to the respective electromechanical element. The link member has a contact portion intended for contacting a surface of a body to be moved. The link member has a respective mechanical link connecting portion to the vibrating bodies in the connection direction. The mechanical link connecting portions are the only mechanical attachments of the link member to any other part of the ultrasonic electromechanical stator. The two vibration bodies and the link member together constitute a vibration assembly. Each of the vibration bodies is mechanically attached to the stator support by at least two attachment tabs on at least one side, in a direction transverse to both the connection direction and the bending direction, of the respective vibration bodies. The attachment tabs are provided in directions transverse to both the connection direction and the bending direction, whereby mechanical translation of the vibration bodies in the directions transverse to both the connection direction and the bending direction is counteracted.

In a second aspect, an ultrasonic electromechanical motor, comprises an ultrasonic electromechanical stator according to the first aspect. The ultrasonic electromechanical motor further comprises a body to be moved, means for providing a normal force and a voltage supply. The body to be moved is arranged with a contact surface against the contact portion of the link member. The means for providing a normal force is configured for providing the normal force between the body to be moved and the ultrasonic electromechanical stator. The voltage supply is configured to independently and controllably provide voltages to the two vibration bodies.

One advantage with the proposed technology is that the motor provides possibilities to reach higher output forces, higher output speed and/or a reduced power consumption in a reproducible manner. Other advantages will be appreciated when reading the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

The technology presented here relates to an electromechanical motor based on the action of electromechanically active actuator materials. The actuator materials are characterised as electromechanical materials, but in the present disclosure we intend materials that change their shape when an electric voltage or current is applied. Typical examples of electromechanical materials are piezoelectric, electrostrictive and antiferroelectric materials and these materials could be single crystalline as well as polycrystalline or amorphous.

In the embodiments presented here below, piezoelectric materials are assumed, but just as an example.

The stators and motors described here below can in general be used for achieving a linear or rotating motion. The electromechanical materials are typically operated in the ultrasound area through applying of an AC voltage.

For a better understanding of the proposed technology, it may be useful to begin with a brief overview of the basic motion principles.

Figure 1:
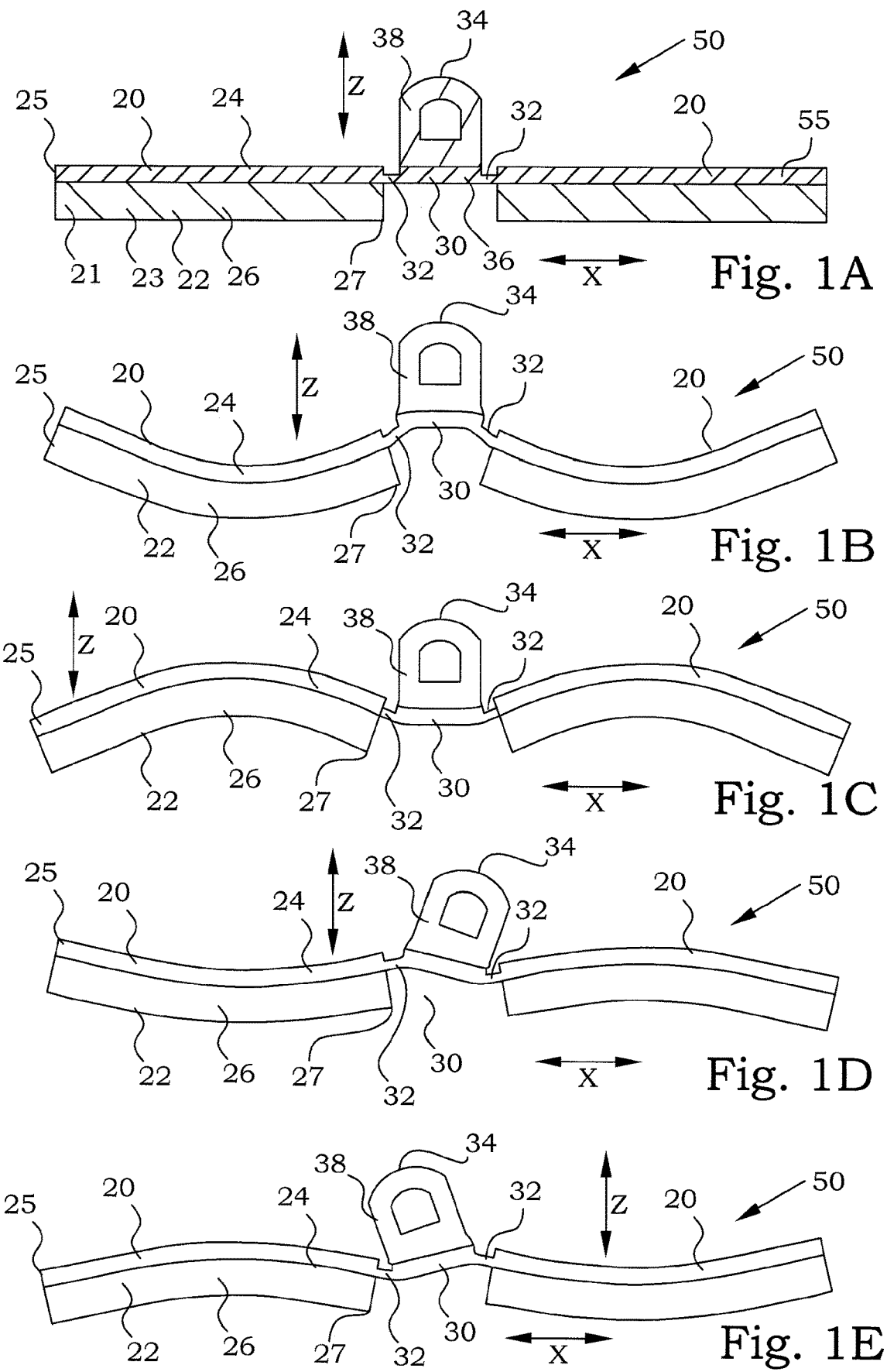
FIGS. 1A-1E illustrate vibration-body dominating symmetric vibration resonance modes of an embodiment of a vibration assembly.

FIG. 1A illustrates an embodiment of a vibration assembly 50 in a cross-sectional view. The vibration assembly 50 comprises two vibration bodies 20, connected along a connection direction X by a link member 30. The link member 30 comprises a drive pad 38 having a contact portion 34 intended for contacting a surface of a body to be moved (not shown here). The link member has mechanical link connecting portions 32 to respective vibrating body in the connection direction X. The mechanical link connecting portions 32 are the only mechanical attachments to any other part of the ultrasonic electromechanical stator in which the vibration assembly 50 is a part. The vibration bodies 20 comprises a respective electromechanical element 23. Each of the vibration bodies 20 is configured to perform bending vibrations in a bending direction Z, transverse to the connection direction X, when an alternating voltage is applied to the respective electromechanical element 23. In other words, the bending direction Z is non-parallel to the connection direction X.

FIG. 1B illustrates a situation of the vibration assembly of FIG. 1A, where the electromechanical elements 23 have been excited by a respective voltage to cause each vibration body 30 to bend. In this situation, a free end 25 as well as a connected end 27 of both vibration bodies 20 are bent slightly upwards, as illustrated in the figure, while the center part 26 of both vibration bodies 20 is bent slightly downwards. The upwards stroke of the connected ends 27 will cause the entire link member 30 to be translated upwards in the Z direction, i.e. towards the intended body to be moved (not shown here). Since the bendings of the vibration bodies 20 are essentially the same, the motion of the link member 30 will essentially be a pure translation in the Z direction.

The mechanical link connecting portions 32 are bent to compensate for the rotation of the connected ends 27, while the main part of the link member 30 is essentially non-bent.

FIG. 1C illustrates a similar situation, but where free ends 25 and connected ends 27 of both vibration bodies 30 are directed downwards, i.e. away from the body to be moved. The downward stroke of the connected ends 27 will cause the entire link member 30 to be translated downwards in the Z direction, i.e. away from the intended body to be moved (not shown here). Since the bendings of the vibration bodies 20 also here are essentially the same, the motion of the link member 30 will essentially be a pure translation in the Z direction. The mechanical link connecting portions 32 are bent to compensate for the rotation of the connected ends 27, in an opposite direction as compared to FIG. 1B, while the main part of the link member 30 is essentially non-bent.

FIGS. 1B and 1C are both typical momentary situations of a resonance mode of the vibration assembly. This resonance mode is here denoted a vibration-body dominating symmetric vibration resonance mode, since most of the motion in the resonance mode is performed by the vibration bodies, and the vibrations of the vibration bodies are essentially symmetric. The resonance mode results in a movement of the contact portion 34 in the Z direction, i.e. up and down in the figures, or towards and away from the body to be moved.

Note that the strokes of the vibrations in the figures are enormously exaggerated for illustration purposes in order to visualize the conditions in an understandable way.

FIG. 1D illustrates a situation of the vibration assembly of FIG. 1A, where the electromechanical elements 23 have been excited by opposite respective voltage to cause each vibration body 30 to bend. In this situation, a free end 25 as well as a connected end 27 of one vibration body 20 is bent slightly upwards, as illustrated in the left part figure, while the center part 26 of the left vibration body 20 is bent slightly downwards. Likewise, a free end 25 as well as a connected end 27 of the other vibration body 20 is bent slightly downwards, as illustrated in the right part figure, while the center part 26 of the left vibration body 20 is bent slightly upwards. The upwards stroke of one of the connected ends 27 and the downward stroke of the other of the connected ends 27 will cause the entire link member 30 to be tilted to the right in the X direction, i.e. in the intended motion direction the body to be moved (not shown here). Since the bendings of the vibration bodies 20 are essentially asymmetric, the motion of the link member 30 will essentially be a pure tilting in the X direction. The mechanical link connecting portions 32 are bent to compensate for the rotation of the respective connected ends 27, while the main part of the link member 30 is essentially non-bent.

FIG. 1E illustrates a similar situation, but where the vibration bodies 30 are excited in an opposite manner. The strokes of the connected ends 27 will cause the entire link member 30 to tilt in the X direction, in the opposite direction as compared to FIG. 1D. The mechanical link connecting portions 32 are bent to compensate for the rotation of the connected ends 27, in an opposite direction as compared to FIG. 1D, while the main part of the link member 30 is essentially non-bent.

FIGS. 1D and 1E are both typical momentary situations of another resonance mode of the vibration assembly. This resonance mode is here denoted a vibration-body dominating anti-symmetric vibration resonance mode, since most of the motion in the resonance mode is performed by the vibration bodies, and the vibrations of the vibration bodies are essentially anti-symmetric. The resonance mode results in a movement of the contact portion 34 in the X direction, i.e. to the right and left in the figures, or along the body to be moved.

In FIGS. 1B-E, the hatching has been removed in order to make the figures more readable.

When two vibration bodies, having a resonance mode for free vibrations, are connected to each other, the connection will cause a transfer of motion and energy between the two vibration bodies. The resonance mode for free vibrations will combine into two resonance modes of the total assembly, one with symmetric vibrations of the vibrating bodies and one with anti-symmetric vibrations of the vibrating bodies, c.f. the illustrated modes above. The typical case is that the symmetric resonance mode will appear at a lower frequency than the anti-symmetric resonance mode. In the examples above, the typical case is thus that the vibration-body dominating symmetric vibration resonance mode has a resonance frequency that is lower than the resonance frequency of the vibration-body dominating anti-symmetric vibration resonance mode. In general, the more rigid the link is, the larger is the difference in resonance frequencies of the two resonance modes.

In the technology presented here, the two vibration modes presented above are used for creating a motion. An electromechanical motor is based upon a stator and a body to be moved by the stator through friction contact. The stator can be put in vibration in the ultrasonic frequency range and has a contact area that will vibrate in an elliptical trajectory.

The vibrating bodies are put into vibration through AC voltage of at least two phase shifted signals to the two vibrating bodies. The operating frequency may be chosen to be in the vicinity of the natural resonance frequencies of the resonance modes of the vibration assembly of the vibrating bodies, causing the contacting portion to perform an elliptic motion. The contacting portion may transfer this elliptic motion into a translation of a body to be moved, where the motion in the Z direction is responsible for contacting and releasing the contacting portion to and from the body to be moved and the motion in the X direction is responsible for the actual translation and for the retracting of the contacting portion without contact with the body to be moved. Such principles are, as such, well known in the art.

In order to achieve the motion, a normal force has to be applied between the vibration assembly and the body to be moved. In other words, there has to be some mechanical connection between the vibrating bodies or the link there between and a normal force applying means. Such an attachment arrangement will to a certain degree influence the vibration behavior. The attachment arrangements have to be strong enough to be able to mediate the normal forces. At the same time, the attachment arrangements have to be weak enough and/or arranged in a way that disturbs the resonance behavior as little as possible.

Figure 2:
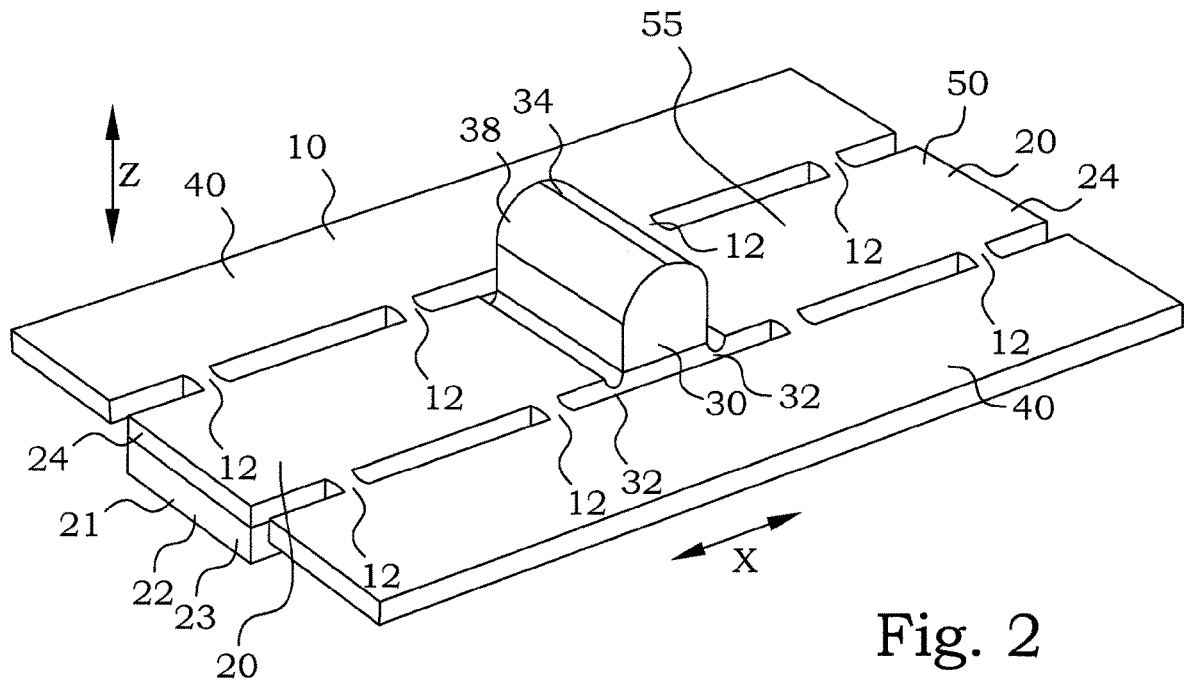
FIG. 2 is an elevational view of an embodiment of an ultrasonic electromechanical stator.

FIG. 2 illustrates a schematic illustration of an embodiment of an ultrasonic electromechanical stator 10. The ultrasonic electromechanical stator 10 comprises two vibration bodies 20 connected by a link member 30. The link member 30 connects the two vibration bodies 20 along a connection direction X. The link member 30 has mechanical link connecting portions 32 to respective vibrating body 20 in the connection direction X. The mechanical link connecting portions 32 are the only mechanical attachments to any other part of the ultrasonic electromechanical stator 10. However, the link member 30 has a contact portion 34 intended for contacting a surface of a body to be moved (not shown). In this embodiment, the contact portion is provided at a drive pad 38 of the link member 30. The drive pad 38 extends transversal to a connection line between the mechanical link connecting portions 32.

The two vibration bodies 20 and the link member 30 together constitute a vibration assembly 50. The ultrasonic electromechanical stator 10 further comprises a stator support 40, in this embodiment illustrated as sheet portions on both sides of the vibration assembly 50.

Each of the vibration bodies 20 comprises a respective electromechanical element 23, typically a piezoelectric volume 22. Each of the vibration bodies 20 is configured to perform bending vibrations in a bending direction Z, transverse to the connection direction X, when an alternating voltage is applied to the respective electromechanical element.

In this embodiment, each of the vibration bodies 20 comprises an assembly of a piezoelectric volume 22 and a vibration element elastic volume 24, in this case a metal sheet. The piezoelectric volume 22 is attached to the metal sheet at at least two spatially separated positions, and typically continuously along the entire contact area. Such an arrangement thus gives rise to a unimorph member 21. In other words, a dimension change of the piezoelectric volume 22 causes a bending of the unimorph member 21, i.e. here the assembly of the piezoelectric volume 22 and the vibration element elastic volume 24, i.e. the metal sheet.

In other words, in this context, "unimorph" is used as a denotation of a combination of an electromechanical element 23 and a non-electromechanical element, e.g. a metal sheet, while the term "bimorph" is used as a denotation of a combination of at least two electromechanical elements.

Each of the vibration bodies 20 is mechanically attached to the stator support 40 by attachment tabs 12. The attachment tabs 12 are provided on at least one side, in a direction transverse to both the connection direction X and the bending direction Z, of respective vibration body 20. In other words, the attachment tabs 12 are provided in a direction that is non-parallel to the connection direction X as well as non-parallel to the bending direction Z. Each of the vibration bodies 20 is mechanically attached to the stator support 40 by two attachment tabs 12 on a same side of the respective vibration body. In the present embodiment, where the stator support is present on both sides of the vibration assembly 50, two attachment tabs 12 are provided on both sides of the vibration bodies 20. In other words, each of the vibration bodies 20 is mechanically attached to the stator support 40 by at least two attachment tabs 12 on each of opposite sides, in a direction transverse to both the connection direction X and the bending direction Z, of respective vibration body 20. The attachment tabs 12 are provided in directions transverse to both the connection direction X and the bending direction Z. This leads to that mechanical translation of the vibration bodies in the directions transverse to both the connection direction X and the bending direction Z is counteracted. The attachment tabs 12 and the mechanical link connection portions 32 of the link member 30 are the only mechanical attachments of the vibration body 20 to any other part of the ultrasonic electromechanical stator 10, if wires, and/or other circuitry for supplying voltages to the electromechanical elements 23 are disregarded. In other words, in this context, "mechanical attachments" are defined as attachments influencing the mechanical vibration properties of the vibration assembly. In general, electrical wiring is not included as "mechanical attachments".

The provision of the attachment tabs 12 puts some restrictions to the vibration behavior of the vibration assembly 50. If the attachment tabs 12 are relatively short, which often is the case for reducing the overall volume, the translational movement in the connection direction X and the bending direction Z of the parts of the vibration bodies close to the attachment tabs is severely restricted. However, if the attachment tabs 12 are made reasonable narrow and thin, a rotation of the parts of the vibration bodies close to the attachment tabs around an axis transverse to both the connection direction X and the bending direction Z is essentially allowed without significant influence.

The effect of the provision of two attachment tabs between the vibrating bodies 20 and the stator support on one and the same side is that the occurrence and stability of the vibration-body dominating symmetric vibration resonance mode and the vibration-body dominating anti-symmetric vibration resonance mode, as described further above, is enhanced. Thus, in a stator provided with two attachment tabs between the vibrating bodies 20 and the stator support on one and the same side, the vibration assembly has well-defined vibration resonance modes. A vibration-body dominating symmetric vibration resonance mode of the vibration resonance modes presents bending vibrations of the two vibration bodies 20 that are symmetric around the link member 30 at a vibration-body dominating symmetric vibration resonance frequency. Likewise, a vibration-body dominating anti-symmetric vibration resonance mode of the vibration resonance modes presents bending vibrations of the two vibration bodies 20 that are anti-symmetric around the link member 30 at a vibration-body dominating anti-symmetric vibration resonance frequency.

In a preferred embodiment, the attachment tabs 12 are positioned at nodal points of at least one of the vibration-body dominating symmetric vibration resonance mode and the vibration-body dominating anti-symmetric vibration resonance mode. If the link member 30 is relatively weak compared to the vibration bodies, these nodal points of the two vibration modes do essentially coincide.

A free uniform beam in a first resonance bending vibration mode achieves theoretically nodes in points 22.4% from each end. In a vibration assembly, where two such beams are connected by a link, the nodal points are moved somewhat in the direction of the link. The exact position depends on the particular design of the link. The nodal point closest to the link is in general displaced more than the nodal point closest to the free end.

In different embodiments, different link member designs have been tested. A too weak link member has disadvantages in the ability to provide a sufficient force on the drive pad. A too stiff link member instead reduces the stroke of the connected end. The most promising embodiments were found to be in the intermediate range. Such preferred vibration assemblies of straight beam vibrating bodies had in common that for each of the vibration bodies, a distance between a nodal point, and therefore the preferred position of an attachment tab, and a closest one of the mechanical link connecting portions is in the range of 7-20% of a length in the connecting direction of the vibration body.

Figure 3:
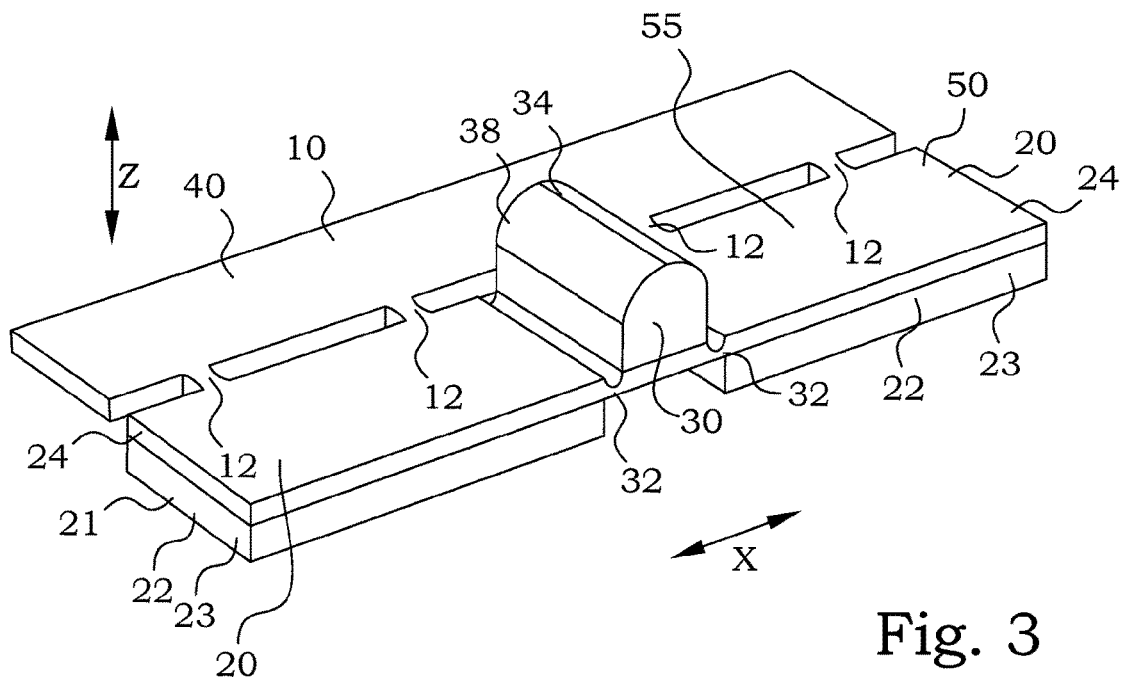
FIG. 3 is an elevational view of another embodiment of an ultrasonic electromechanical stator.

In some applications, the stator support 40 may be provided only at one side of the vibration assembly 50. FIG. 3 illustrates schematically one embodiment of such an ultrasonic electromechanical stator 10. Here the vibration bodies 20 are attached to the stator support 40 by attachment tabs 12 provide at only one side of the vibration body 20. Such embodiments may be useful e.g. in providing rotational movements, see also examples further below. The asymmetric attachment will influence the vibrational behavior somewhat. However, the main operational conditions are essentially the same.

Figure 4:
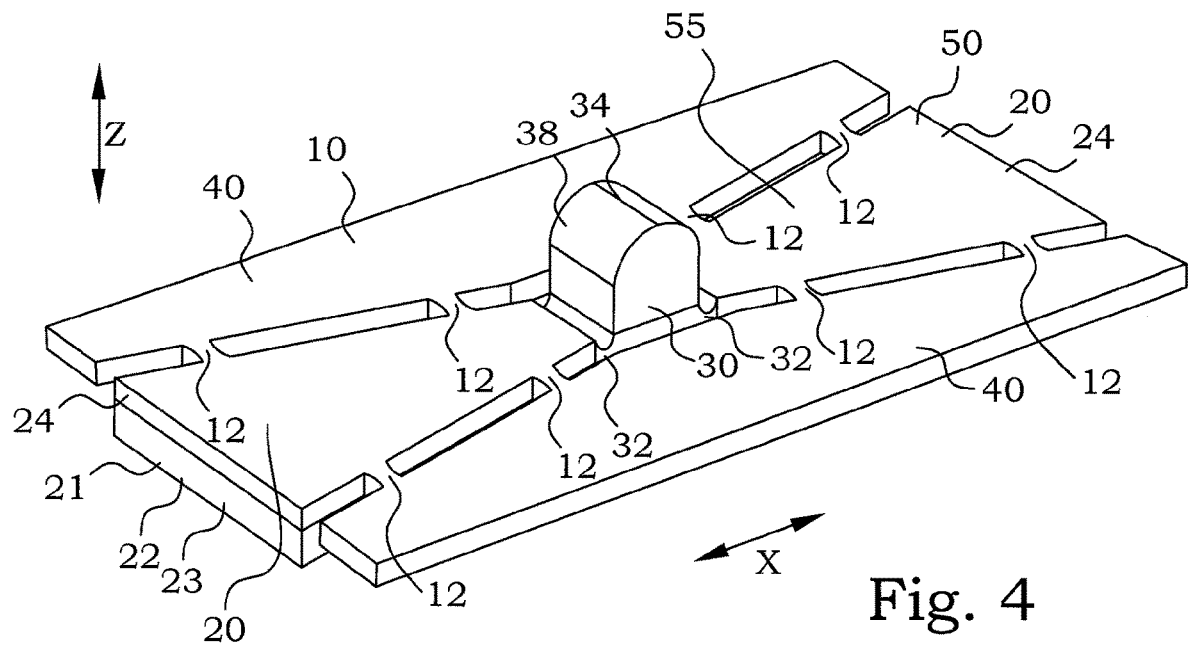
FIG. 4 is a elevational view of a of yet another embodiment of an ultrasonic electromechanical stator, having tapered vibration bodies.

In alternative embodiments, the shape of the vibration bodies can be used for modifying the vibrational properties. In FIG. 4, an embodiment of an ultrasonic electromechanical stator 10 is illustrated. In this embodiment, the vibration bodies 20 have a tapered shape in a plane normal to the bending direction Z. A respective narrow end is used as a connected end 27 of the vibration bodies 20 and is thus connected to the link member 30. A respective wide end is used as the free end 25 of the vibration bodies 20. The tapered shape is here illustrated as being a linearly varying width along the vibration body 20, however, there are numerous of other tapered shapes that also are possible to use. Tapered shaped vibration bodies 20 in general give a larger stroke amplitude at the narrow end compared to straight beam embodiments.

In an alternative embodiment, the tapering of the vibration bodies may be provided in the opposite direction, i.e. a respective wide end is used as a connected end of the vibration bodies and is thus connected to the link member. A respective narrow end is used as the free end of the vibration bodies.

The energy efficiency of an ultrasonic motor is often improved if different resonance behaviors of the vibrating parts are used. It is therefore often beneficiary to select an operation frequency that is situated at or close a natural resonance frequency of the stator. In the present type of motor, an elliptical motion of the contact portion is achieved by combining two resonant vibration modes, i.e. the vibration-body dominating symmetric vibration resonance mode and the vibration-body dominating anti-symmetric vibration resonance mode. A preferred operation frequency is selected to be close to at least one of the associated resonance frequencies. As mentioned further above, the linking of the two vibrating bodies will split the first resonance mode of a single free vibrating body into one symmetric and one anti-symmetric resonance mode, having slightly differing resonance frequencies.

Figure 9:
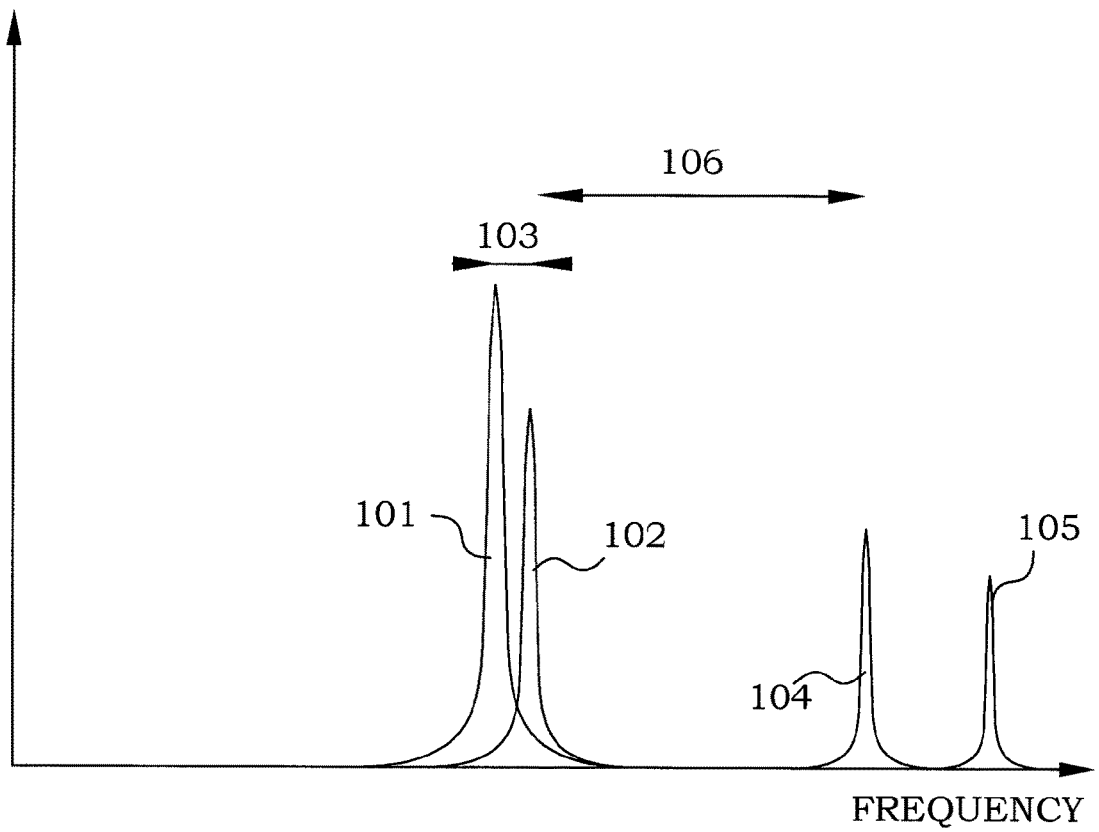
FIG. 9 is a diagram illustrating mechanical resonance characteristics of an embodiment of a vibration assembly.

FIG. 9 illustrates schematically a resonance behavior of an embodiment of an ultrasonic motor according to the description above as a diagram showing a stroke of a contact portion as a function of frequency. Curve 101 is intended to illustrate the vibration-body dominating symmetric vibration resonance mode and curve 102 is intended to illustrate the vibration-body dominating anti-symmetric vibration resonance mode. The linking of the vibration bodies creates a dependency that gives rise to a certain difference 103 in resonance frequency.

A large difference between these resonance frequencies will result in that at most one of the resonance frequencies can be situated close to the selected operation frequency at each time. If the resonance frequencies on the other hand are situated relatively close to each other, some resonant contributions from both resonance modes may be used.

Therefore, in a preferred embodiment, the vibration-body dominating symmetric vibration resonance frequency differs from the vibration-body dominating anti-symmetric vibration resonance frequency by less than 10%. In other words, the difference 103 is less than 10% of the frequency of the vibration-body dominating symmetric vibration resonance mode.

As briefly discussed above, a strong connection between the vibrating bodies will cause a strong interaction between the vibrational behavior of the two vibrating bodies and the separation of the resonance frequencies will in general be relatively large. By reducing the "bending stiffness" of the link, the interaction between the vibrating bodies will be reduced and the difference between the symmetric and anti-symmetric resonance frequencies will in general be smaller.

However, upon reducing the bending stiffness of the link member, also other effects occur. If two resonance frequencies of a body are very close to each other, the resonance modes will couple to each other and give rise to different kinds of mixing behaviors. Such mixing behaviors may under different circumstances be very difficult to control and predict and in order to achieve reproducible results in such situations, mixed resonance modes should therefore preferably be avoided.

As a conclusion, in some applications, a weak coupling between the vibrating bodies is to prefer. However, the coupling cannot be too weak, since the practical applicability may be detrimentally influenced. It is therefore important to have some degree of mechanical coupling between the vibrating bodies. The vibration bodies are thereby required to be provided to be weakly dependent on each other. This has the implication that preferably the resonance frequency difference should not be too low.

Therefore, in one embodiment, the vibration-body dominating symmetric vibration resonance frequency differs from the vibration-body dominating anti-symmetric vibration resonance frequency by more than 0.2%. In other words, the difference 103 is larger than 0.2% of the frequency of the vibration-body dominating symmetric vibration resonance mode.

As concluded above, the properties of the link member contribute to the coupling of the vibrations dominated by the vibrating bodies. This is not the only effect the link member has on vibration properties. Every participating mechanical part having an extension and a mass will contribute to vibrations in different ways. The link member with its two mechanical link connection portions will also participate in other bending modes. A free link member, without connections to any vibrating bodies will have its natural resonance frequencies for different bending modes. These resonance modes will then of course be heavily influenced by being connected to vibration bodies on both sides. The resonance modes will also be different for a link member being retracted from contact with a body to be moved and for a link member in mechanical contact with the body to be moved.

Figure 5A:
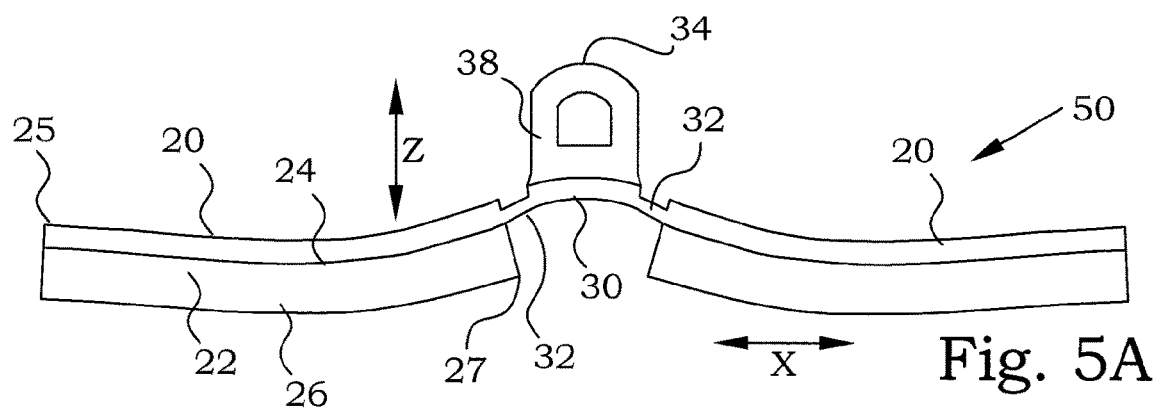
FIGS. 5A-5D illustrate link dominating symmetric vibration resonance modes of an embodiment of a vibration assembly.
Figure 5B:
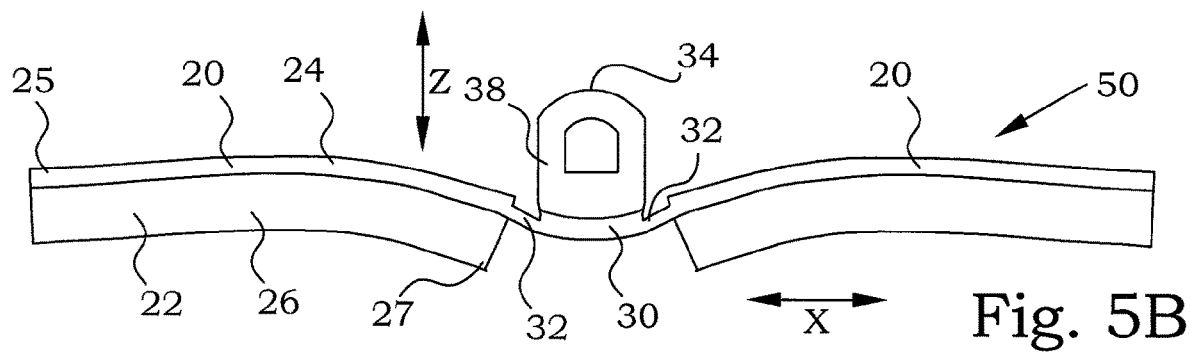

In a first link member free vibration resonance bending mode, the link member bends with the mechanical link connection portions having strokes in a same direction and having a stroke in the center part in an opposite direction. Combining such a mode with two connected vibration bodies will give a link dominating symmetric vibration resonance mode. This link dominating symmetric vibration resonance mode presents bending vibrations of the two vibration bodies having strokes in same directions around the link member, thus being "symmetric" in some sense. Such a resonance mode is schematically illustrated in FIG. 5A. A main displacement of the mechanical link connection portions 32 of the link member 30 in the bending direction causes a displacement of the entire link member 30. On top of this, the bending of the link member itself will move the central part of the link member 30, in particular the contact portion 34 even further upwards, as illustrated in the figure. Note that the bending of the mechanical link connection portions 32 is smaller than in the two previously discussed resonance modes and a larger part of the bending is made within the entire length of the link member 30. A similar situation, half a period later, is illustrated in FIG. 5B. Due to the non-negligible contribution of the link member itself, this mode is here denoted a link dominating symmetric vibration resonance mode, and occurs at a link dominating symmetric vibration resonance frequency.

Figure 5C:
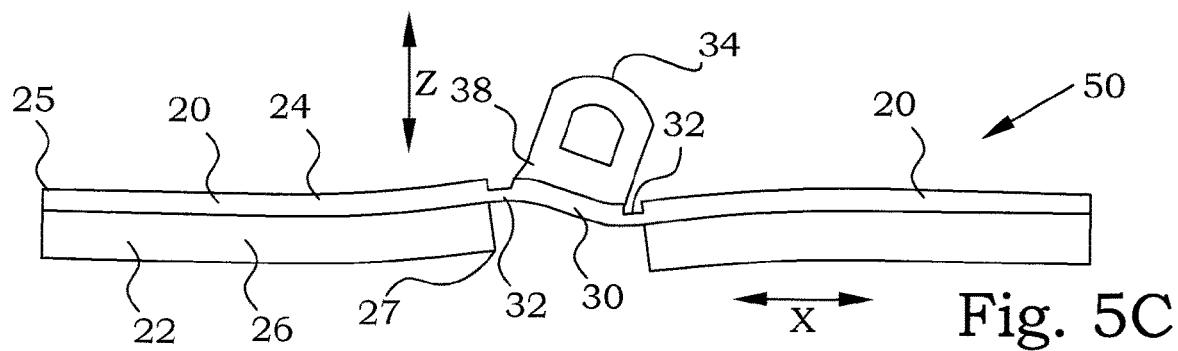
Figure 5D:
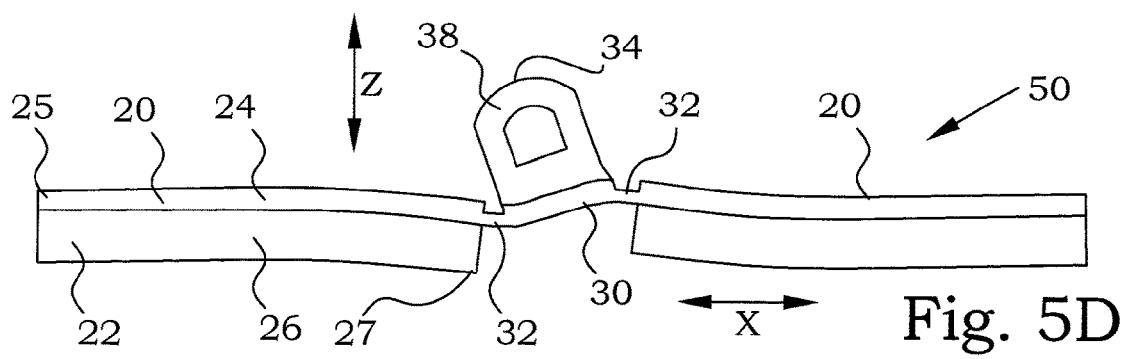

In a second link member free vibration resonance bending mode, the link member bends with the mechanical link connection portions having strokes in opposite directions and having a node in the center part. Combining such a mode with two connected vibration bodies will give a link dominating anti-symmetric vibration resonance mode presenting bending vibrations of the two vibration bodies having strokes in opposite directions around the link member, thus being anti-symmetric in some sense. Such a resonance mode is schematically illustrated in FIG. 5C. A displacement of the mechanical link connection portions 32 of the link member 30 in opposite bending direction causes only minor displacements of the entire link member 30 in the Z direction. Instead, a tilting of the entire link member 30 is achieved. On top of this, the bending of the link member itself will move the central part of the link member 30, in particular the contact portion 34 even further sideward, as illustrated in the figure. Note that the bending of the mechanical link connection portions 32 is smaller than in the two first discussed resonance modes and a larger part of the bending is made within the entire length of the link member 30. A similar situation, half a period later, is illustrated in FIG. 5D. Due to the non-negligible contribution of the link member itself, this mode is here denoted a link dominating anti-symmetric vibration resonance mode, and occurs at a link dominating anti-symmetric vibration resonance frequency.

In FIGS. 5A-D, the hatching has been removed in order to make the figures more readable.

It can be noted that the strokes in Z and X directions using such link dominating resonance modes in general are smaller than corresponding strokes of vibration-body dominating resonance modes. A large portion of the energy excited in such link dominating resonance modes are therefore believed to stay within the link member as energies of a standing wave. Such a standing wave will eventually lose its energy as heat dissipated in the link member and is thereby not contributing to any motion activities. It is therefore of benefit to arrange the resonance frequencies of these link dominating resonance modes at considerably higher frequencies than the resonance frequencies of the vibration-body dominating resonance modes to avoid that any considerable energy is excited in these modes.

In FIG. 9, the link dominating symmetric vibration resonance is represented by curve 104 and the link dominating anti-symmetric vibration resonance is represented by curve 105. The lowest one of the resonance frequency of the link dominating symmetric vibration resonance and the resonance frequency of the link dominating anti-symmetric vibration resonance exceeds the highest one of the resonance frequency of the vibration-body dominating anti-symmetric vibration resonance and the vibration-body dominating symmetric vibration resonance by a frequency difference 106.

In one embodiment, both the link dominating symmetric vibration resonance frequency and the link dominating anti-symmetric vibration resonance frequency exceeds both the vibration-body dominating anti-symmetric vibration resonance frequency and the vibration-body dominating symmetric vibration resonance frequency by more than 5% and preferably more than 20%. In other words, the difference 106 is larger than 5%, preferably larger than 20%, of the highest one of the frequency of the vibration-body dominating anti-symmetric vibration resonance mode and the frequency of the vibration-body dominating symmetric vibration resonance mode.

The resonance frequencies of the link dominating resonance modes are significantly influenced by different properties of the link member, as can be expected. A thin link member will in general give a lower resonance frequency than a thicker link member. Similarly, a long link member will in general give a lower resonance frequency than a short link member. Also the bending stiffness of the mechanical link connection portions will influence the resonance frequency. A weak mechanical link connection portion, i.e. a mechanical link connection portion having a low bending stiffness, will in general give a lower resonance frequency than a mechanical link connection portion having a high bending stiffness.

One can here notice that a low bending stiffness is advantageous for reducing the resonance frequency difference between the vibration-body dominating resonance modes, however, disadvantageous for maintaining the force and for separating the frequencies of the link dominating resonance modes from the frequencies of the vibrating-body dominating resonance modes. Concerning the length and thickness of the link member, the vibration-body dominating resonance modes are less influenced than the link dominating resonance modes.

Also other factors such as the mass of the link member, and in particular the mass of the drive pad, influences the differences between the different resonance mode frequencies.

The actual design choices are preferably adapted to the particular application of the motor. For high demands on applied force, the mechanical link connection portions should not be made too weak. However, if energy efficiency is of more importance, the mechanical link connection portions could be made relatively weak and instead, the other link member parts could be made stiffer in order to ensure that the link dominating resonance modes are not interfering.

In most application, some weakening of the mechanical link connection portions compared to the rest of the link member, is requested. Therefore in one embodiment, at least one of the mechanical link connecting portions, and preferably both, has a bending stiffness, in the direction of the bending vibrations, that is less than 50% of a bending stiffness, in the direction of the bending vibrations, of the link member excluding the link connecting portions.

However, a too weak mechanical link connection portion is not of benefit either in many applications. Therefore, in one embodiment, at least one of the mechanical link connecting portions, and preferably both, has a bending stiffness, in the direction of the bending vibrations, that is higher than 5% of a bending stiffness, in the direction of the bending vibrations, of the link member excluding the link connecting portions.

Figure 6A:
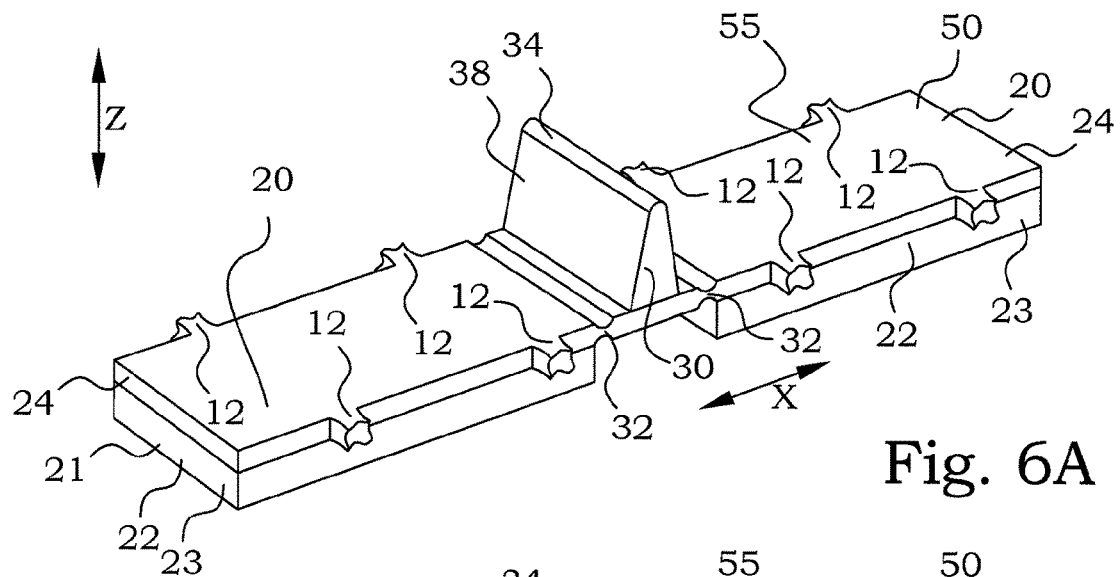
FIGS. 6A-6E are elevational views of embodiments of vibration assemblies.

The weakening of the mechanical link connection portion can be achieved in different ways. FIG. 6A illustrates one embodiment, where at least one of, and preferably both, the mechanical link connection portion bending stiffness is adapted in that of the link connecting portions are thinner, in the direction of the bending vibrations, than the main parts of the link member and the vibrating bodies. In other words, in this embodiment, the weakening is achieved by hollow out material from the upper and/or lower surface of the mechanical link connection portion.

Figure 6B:
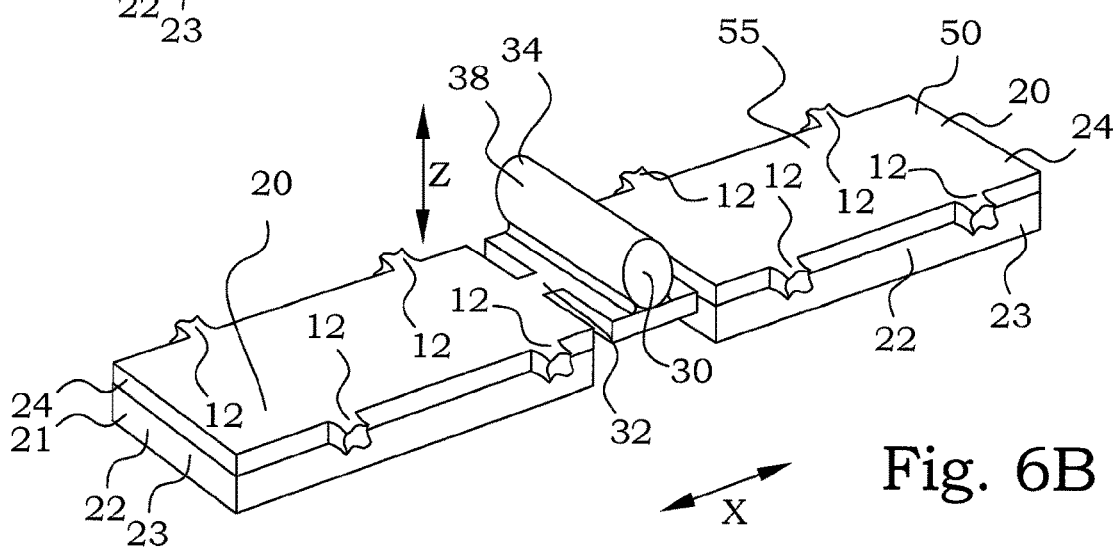

FIG. 6B illustrates another embodiment, where at least one of, and preferably both, the link connecting portions are narrower, in a direction perpendicular to the bending vibrations, than the main parts of the link member and the vibrating bodies. In other words, in this embodiment, the weakening is achieved by removing material from the side surface of the mechanical link connection portion.

Figure 6C:
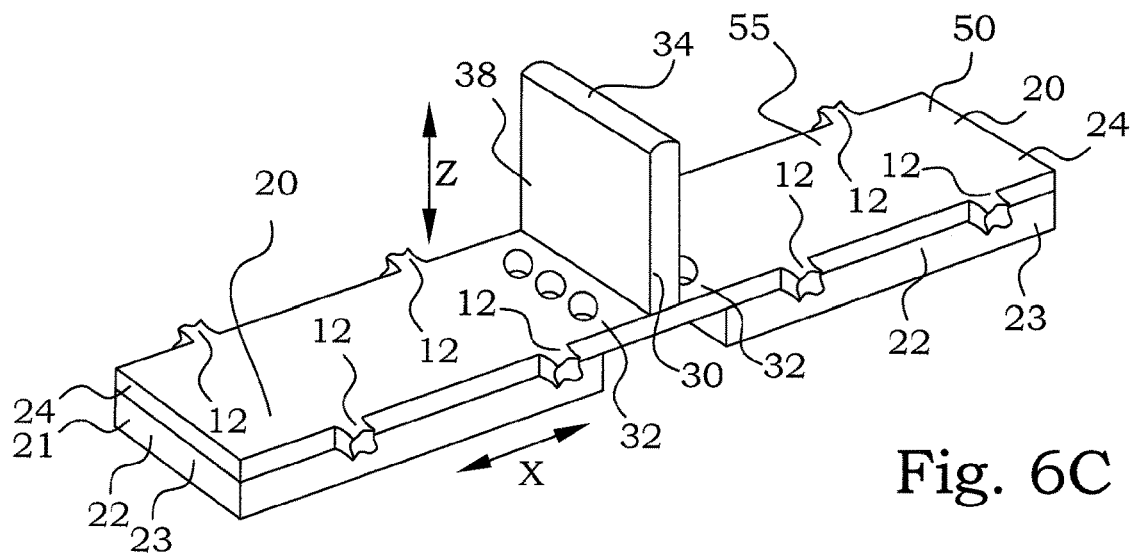

Yet another variation of this is to provide the mechanical link connection portions with holes, thereby reducing its efficient width. FIG. 6C illustrates another embodiment, where at least one of, and preferably both, the link connecting portions are provided with holes, making the efficient width, in a direction perpendicular to the bending vibrations, narrower than the main parts of the link member and the vibrating bodies.

Figure 6D:
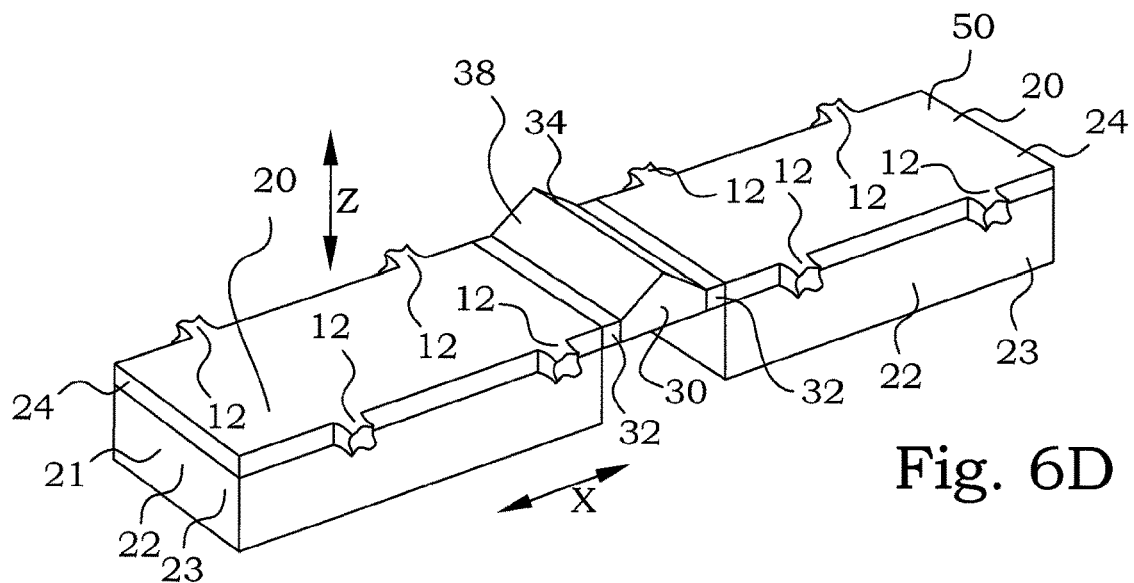

FIG. 6D illustrates another embodiment, where at least one of, and preferably both, the link connecting portions comprises a material that is less rigid than materials of the main parts of the link member and the vibrating bodies. In other words, in this embodiment, the weakening is achieved by connecting the vibrating bodies and the main parts of the link member by a relatively softer material.

Other design choices of the vibrating bodies and the link member may also be used to adapt the operation to the requested applications. It has for instance been noticed that thinner vibrating bodies in general increases the force by which the contact portion can be actuating on the body to be moved. The force in the connection direction is influenced much more than the force in the bending direction. Thin vibrating bodies in general also give a larger amplitude for the moving of the contact portion. The resonance frequencies of the modes dominated by the thin vibrating bodies are also in general lower than for thicker vibrating bodies. It can also be noted that also the frequencies of the link dominating modes are influenced, however, not in the same degree.

Similarly, if the thickness of the link member is changed, the vibration properties are also altered. The available force becomes considerably higher for a relatively thick link member, however, at the same time, the amplitude reduces. Altering the link member thickness may therefore be a possibility to change the relation between amplitude and force of the contact portion. The resonance frequencies of vibration-body dominating modes are in general reduced when the link member is made thinner. This effect is even more pronounced for the link dominating modes. One has therefore to be aware of that by making the link member thinner, the resonance frequencies for the link dominating modes may come closer to the resonance frequencies of vibration-body dominating modes.

Figure 6E:
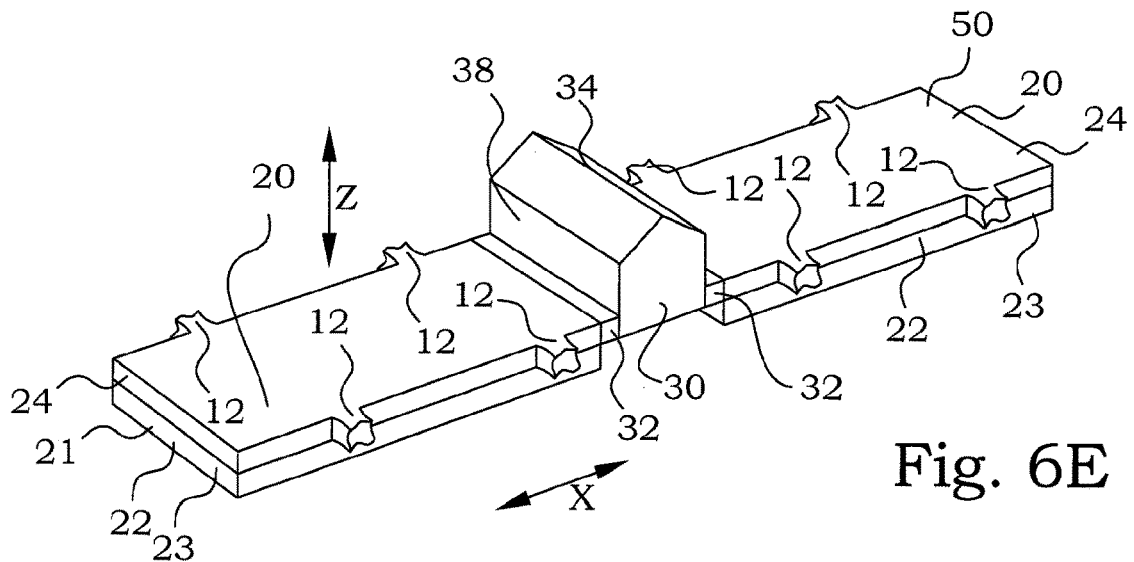

For many applications, it has been found that it is advantageous to have an average thickness in the bending direction of the link member that is larger than an average thickness in the bending direction of the vibrating bodies. FIG. 6E illustrates another embodiment, where the average thickness of the link member is larger than the thickness of the vibration bodies.

The lengths of the vibrating bodies and the link member are also of interest in many applications. A shorter link member will in most cases give a larger available force, in particular in the bending direction, but also the force in the connecting direction does show an increase. A longer link member will typically give a larger amplitude in the bending direction, but a shorter amplitude in the connecting direction. The link member length may therefore by utilized for efficiently change the ratio between strokes in the X and Z directions. A longer link member lowers the resonance frequencies of the link dominating resonance modes. However, the influence on the resonance frequency of vibration-body dominating modes is relatively low.

In most applications, force is typically the most prominent parameter, and in such applications, short links are to be preferred.

However, the length is also related to the bending stiffness. For many applications, it has been found that ratios of the lengths of the vibrating bodies and link member may be related to the respective bending stiffnesses. Thus, in one embodiment, a length of each of the two vibrating bodies in the connection direction is at least 50% longer than a length of the link member in the connection direction. In a further embodiment, a length of each of the two vibrating bodies in the connection direction is larger than twice a length of the link member in the connection direction.

In the embodiments illustrated so far, the vibrating bodies have general flat shapes, with a main surface transversal to strokes of the bending vibrations.

However, in alternative embodiments, also other types of vibrating bodies may be used, e.g. vibrating bodies with varying thickness In the embodiments illustrated above, the contact portion is provided at a drive pad of the link member. The drive pad extends transversal to a connection line between respective mechanical link connections. As can be seen, particular in the FIGS. 6A-E FIG. 7 illustrates schematically an embodiment of an ultrasonic electromechanical motor 1. The ultrasonic electromechanical motor 1 comprises an ultrasonic electromechanical stator 10 according to what has been described here above.

In one particular embodiment, the ultrasonic electromechanical stator 10, comprises two vibration bodies 20, a link member 30 connecting the two vibration bodies 20 along a connection direction X, and a stator support 40. Each of the vibration bodies 20 comprises a respective electromechanical element 23. Each of the vibration bodies 20 is configured to perform bending vibrations in a bending direction Z, transverse to the connection direction X, when an alternating voltage is applied to the respective electromechanical element 23. The link member 30 has a contact portion 34 intended for contacting a surface of a body 60 to be moved. The link member 30 has mechanical link connecting portions 32 to respective vibrating body 20 in the connection direction X. The mechanical link connecting portions 32 are the only mechanical attachments to any other part of the ultrasonic electromechanical stator, and the contact portion is the only contact with the body 60 to be moved. The two vibration bodies 20 and the link member 30 together constitute a vibration assembly 50. Each of the vibration bodies 20 is mechanically attached to the stator support 40 by attachment tabs 12 on at least one side, in a direction transverse to both the connection direction X and the bending direction Z, of the respective vibration bodies 20. Each of the vibration bodies 20 is mechanically attached to the stator support 40 by at least two attachment tabs on the at least one side of the respective vibration bodies 20. The attachment tabs 12 are provided at least in directions transverse to both the connection direction X and the bending direction Z, whereby mechanical translation of the vibration bodies 20 in the directions transverse to both the connection direction X and the bending direction Z is counteracted. The direction creating the actual connection is in other words non-parallel to the connection direction X as well as non-parallel to the bending direction Z. The attachment tabs 12 and the mechanical link connection portions 32 of the link member 30 are the only mechanical attachments of the vibration body 20 to any other part of the ultrasonic electromechanical stator 10 or ultrasonic electromechanical motor 1, if wires, and/or other circuitry for supplying voltages to the electromechanical elements 23 are disregarded, as discussed further above.

The ultrasonic electromechanical motor 1 further comprise a body 60 to be moved, arranged with a contact surface against the contact portion 34 of the link member 30. In the present illustration, the body 60 to be moved is shown as a beam. However, a person skilled in the art realizes that the body 60 to be moved can be any type of solid structure having an interaction surface that is contactable by the contact portion 34.

In order to provide an operation force, the ultrasonic electromechanical stator 10 has to be pressed against the body 60 to be moved by a normal force. This is, as such, well known by anyone skilled in the art, and in this disclosure no further discussion of the normal force is therefore made. A means 70 for providing such a normal force between the body 60 to be moved and the ultrasonic electromechanical stator 10 is schematically illustrated in the figure.

As mentioned above, the operation of the ultrasonic electromechanical motor 1 is performed by applying alternating voltages on the electromechanical elements. Therefore, a voltage supply 80 configured to independently and controllably provide voltages to the two vibration bodies 20 is schematically illustrated in the figure. The ways of applying the voltages depend on the actual design of the eletromechanical elements and are, as such, well known by any person skilled in the art.

When a phase shifted voltage is applied to the eletromechanical elements, e.g. piezoelements, the vibrating bodies will start vibrating with the frequency of the applied voltages, preferably close to their mechanical resonance frequencies. This will cause a vibration also in the link member 30 with its drive pad 38. The contact portion 34 on top of the drive pad 38 will start moving with an elliptical trajectory.

In the illustrated embodiment, each of the vibration bodies 20 comprises an assembly of a piezoelectric volume 22 and a metal sheet 55. The piezoelectric volume 22 is attached to the metal sheet 55 at at least two spatially separated positions. This results in that a dimension change of the piezoelectric volume 22 causes a bending of the assembly of the piezoelectric volume 22 and the metal sheet 55. Preferably, the piezoelectric volume 22 is attached to the metal sheet 55 along the entire common surfaces.

In one embodiment, a continuous metal sheet 55 constitutes at least a part of the two vibrating bodies 20 and at least a part of the link member 30.

Figure 7:
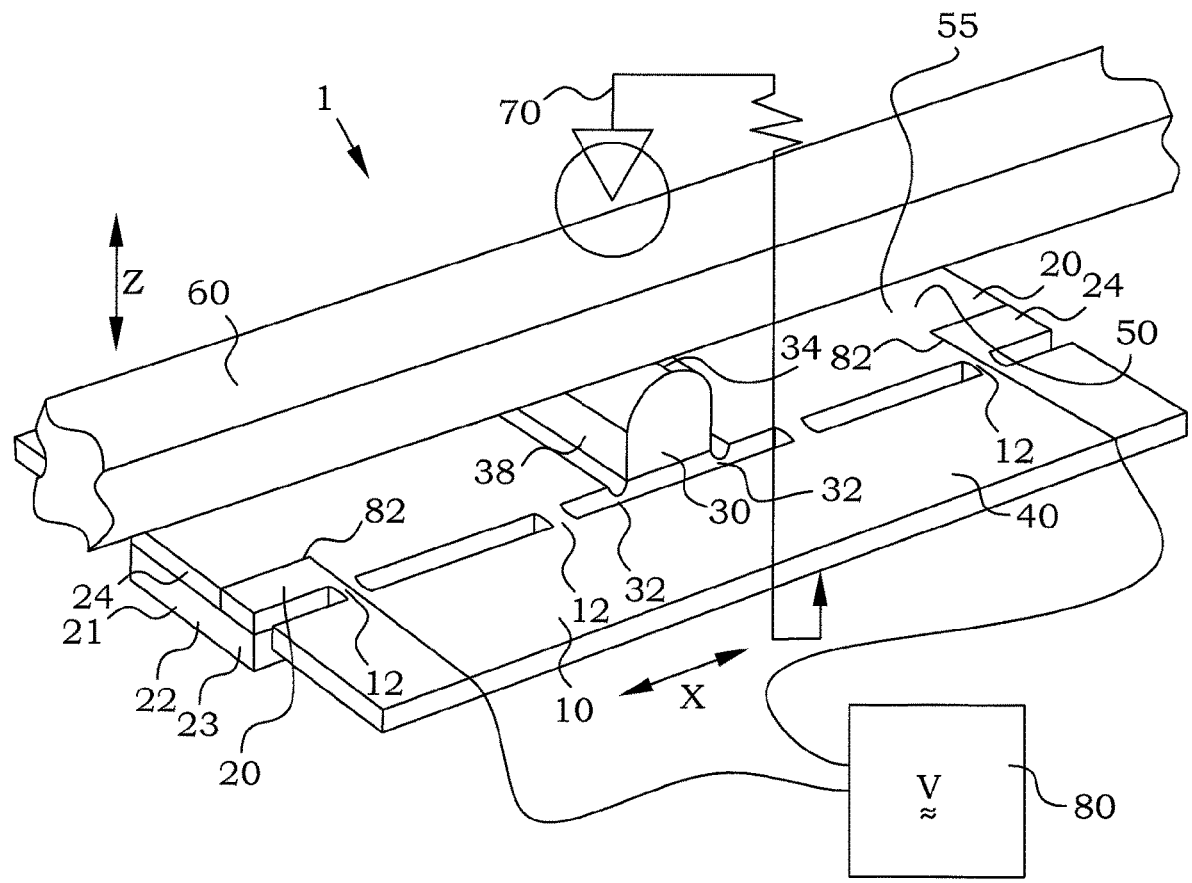
FIG. 7 illustrates schematically an embodiment of an ultrasonic electromechanical motor.

The ultrasonic electromechanical stator 10 is in the embodiment of FIG. 7 based upon a metal sheet 55 that is both a carrier as well as an elastic vibration volume 24. This sheet metal 55 is connected to at least two piezoelectric (electromechanical) elements 22 that together create a vibration body with the metal part 55.

As mentioned above, the electromechanical part can be made of piezo electric material. Softer piezo electric material with higher static deflection is used to get a wide frequency operating motor. Harder piezo electric material with lower static deflection but higher Q-value is preferably used to get higher efficiency, less heat but becomes more drive-frequency dependent.

The metal part needs preferably to be made in a metal that will not plastic deform or reach fatigue in material in critical areas due to the expected loads of the machine.

In other embodiments, it is possible to use other strong but elastic material than metal as elastic volumes of the vibrating bodies.

The drive pad as well as the moving object are preferably made in a hard material that is wear resistant A person skilled in the art knows that the design possibilities are large. In one embodiment, the motor can be made with at least two ultrasonic electromechanical stators on opposite sides of a common body to be moved.

In one embodiment, the motor may be a rotary motor. This can be achieved by putting the actuator parts in friction contact with a disk instead of a bar.

Figure 8:
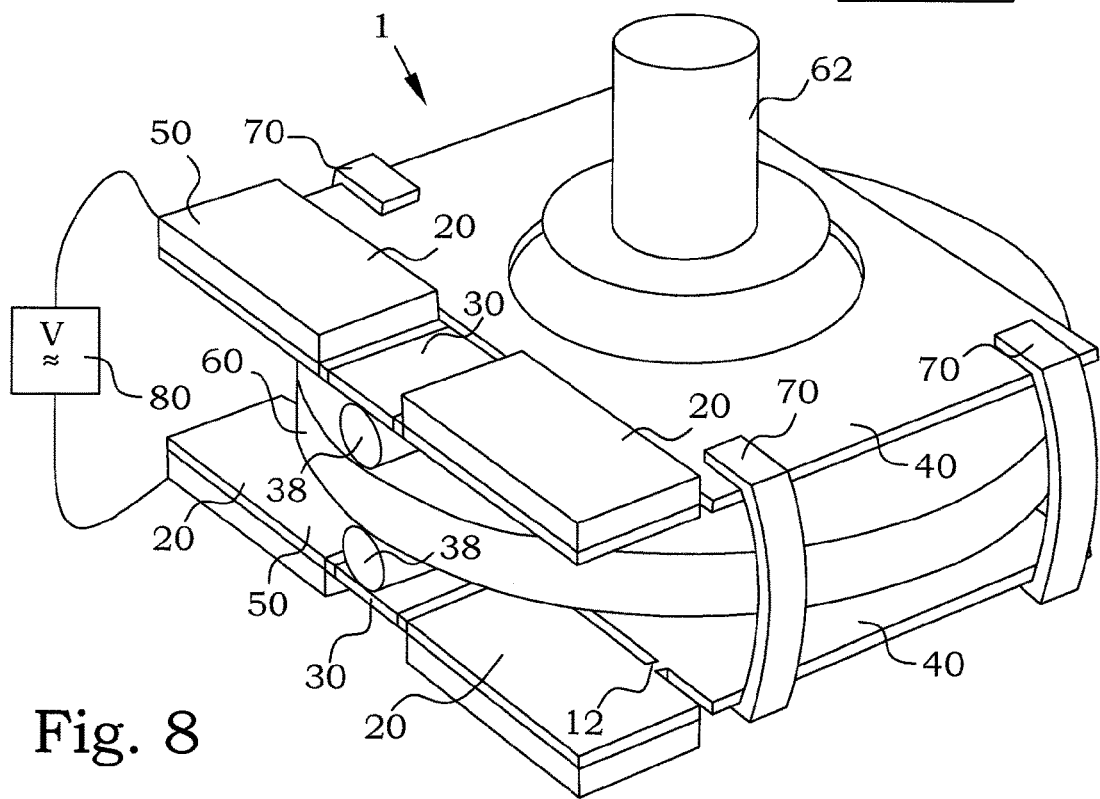
FIG. 8 illustrates schematically an embodiment of an ultrasonic electromechanical rotary motor.

One embodiment of creating a rotary motor with the technology described above is illustrated in FIG. 8. Here two vibration assemblies 50 are provided on each side of a body 60 to be moved, here in the shape of a disc. The means 70 for providing a normal force can here act between the two stator supports 40. A coordinated operation of the two vibration assemblies 50 will cause a rotation of the disc around an axis 62.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. An ultrasonic electromechanical stator, comprising:
two vibration bodies;
a link member connecting said two vibration bodies along a connection direction; and
a stator support;
each of said vibration bodies comprises a respective electromechanical element;
each of said vibration bodies is configured to perform bending vibrations in a bending direction, transverse to said connection direction, when an alternating voltage is applied to the respective electromechanical element;
said link member having a contact portion intended for contacting a surface of a body to be moved;
said link member having mechanical link connecting portions to respective said vibrating bodies in said connection direction;
said mechanical link connecting portions being the only mechanical attachments of said link member to any other part of said ultrasonic electromechanical stator,
whereby said two vibration bodies and said link member together constitute a vibration assembly;
each of said vibration bodies being mechanically attached to said stator support by attachment tabs on at least one side, in a direction transverse to both said connection direction and said bending direction, of said respective vibration bodies;
said attachment tabs being provided in directions transverse to both said connection direction and said bending direction, whereby mechanical translation of said vibration bodies in said directions transverse to both said connection direction and said bending direction is counteracted;
each of said vibration bodies being mechanically attached to said stator support by at least two said attachment tabs on said at least one side of said respective vibration bodies.

2. The ultrasonic electromechanical stator according to claim 1, wherein each of said vibration bodies being mechanically attached to said stator support by at least two said attachment tabs on each of opposite sides, in a direction transverse to both said connection direction and said bending direction, of said respective vibration bodies.

3. The ultrasonic electromechanical stator according to claim 1, wherein
said vibration assembly has vibration resonance modes;
wherein a vibration-body dominating symmetric vibration resonance mode of said vibration resonance modes presents bending vibrations of said two vibration bodies that are symmetric around said link member at a vibration-body dominating symmetric vibration resonance frequency;
wherein a vibration-body dominating anti-symmetric vibration resonance mode of said vibration resonance modes presents bending vibrations of said two vibration bodies that are anti-symmetric around said link member at a vibration-body dominating anti-symmetric vibration resonance frequency; and
said attachment tabs are positioned at nodal points of at least one of said vibration-body dominating symmetric vibration resonance mode and said vibration-body dominating anti-symmetric vibration resonance mode.

4. The ultrasonic electromechanical stator according to claim 1, wherein, for each of said vibration bodies, a distance between an attachment tab and a closest one of said connecting portions is in the range of 7-20% of a length in said connecting direction of said vibration body.

5. The ultrasonic electromechanical stator according to claim 1, wherein each of said vibration bodies has a tapered shape in a plane normal to said bending direction, whereby a respective narrow end of said vibration bodies is connected to said link member and a respective wide end of said vibration bodies is a free end.

6. The ultrasonic electromechanical stator according to claim 1, wherein each of said vibration bodies has a tapered shape in a plane normal to said bending direction, whereby a respective wide end of said vibration bodies is connected to said link member and a respective narrow end of said vibration bodies is a free end.

7. The ultrasonic electromechanical stator according to claim 1, wherein
said vibration assembly has vibration resonance modes;
wherein a vibration-body dominating symmetric vibration resonance mode of said vibration resonance modes presents bending vibrations of said two vibration bodies that are symmetric around said link member at a vibration-body dominating symmetric vibration resonance frequency;
wherein a vibration-body dominating anti-symmetric vibration resonance mode of said vibration resonance modes presents bending vibrations of said two vibration bodies that are anti-symmetric around said link member at a vibration-body dominating anti-symmetric vibration resonance frequency; and
wherein said vibration-body dominating symmetric vibration resonance frequency differs from said vibration-body dominating anti-symmetric vibration resonance frequency by less than 10%.

8. The ultrasonic electromechanical stator according to claim 7, wherein
said vibration-body dominating symmetric vibration resonance frequency differs from said vibration-body dominating anti-symmetric vibration resonance frequency by more than 0.2%.

9. The ultrasonic electromechanical stator according to claim 7, wherein
a link dominating symmetric vibration resonance mode of said vibration resonance modes presents bending vibrations of said two vibration bodies having strokes in same directions around said link member and a main displacement of said contact portion of said link member in said bending direction at a link dominating symmetric vibration resonance frequency;
wherein a link dominating anti-symmetric vibration resonance mode of said vibration resonance modes presents bending vibrations of said two vibration bodies having strokes in opposite directions around said link member and a main displacement of said contact portion of said link member in said connection direction at a vibration-body dominating anti-symmetric vibration resonance frequency; and
wherein both said link dominating symmetric vibration resonance frequency and said link dominating anti-symmetric vibration resonance frequency exceeds both said vibration-body dominating anti-symmetric vibration resonance frequency and said vibration-body dominating symmetric vibration resonance frequency by more than 5%.

10. The ultrasonic electromechanical stator according to claim 1, wherein said vibrating bodies having general flat shape, with a main surface transversal to strokes of said bending vibrations.

11. The ultrasonic electromechanical stator according to claim 1, wherein
said contact portion is provided at a drive pad of said link member;
said drive pad extending transversal to a connection line between respective said mechanical link connecting ports.

12. The ultrasonic electromechanical stator according to claim 11, wherein at least one of said link connecting portions has a bending stiffness, in the direction of said bending vibrations, that is less than 50% of a bending stiffness, in the direction of said bending vibrations, of said link member excluding said link connecting portions.

13. The ultrasonic electromechanical stator according to claim 11, wherein at least one of said link connecting portions has a bending stiffness, in the direction of said bending vibrations, that is higher than 5% of a bending stiffness, in the direction of said bending vibrations, of said link member excluding said link connecting portions.

14. The ultrasonic electromechanical stator according to claim 11, wherein at least one of said link connecting portions has is thinner, in said direction of said bending vibrations, than said main parts of said link member and said vibrating bodies.

15. The ultrasonic electromechanical stator according to claim 11, wherein at least one of said link connecting portions is narrower, in a direction perpendicular to said bending vibrations, than said main parts of said link member and said vibrating bodies.

16. The ultrasonic electromechanical stator according to claim 11, wherein at least one of said link connecting portions are provided with holes, making an efficient width, in a direction perpendicular to said bending vibrations, narrower than said main parts of said link member and said vibrating bodies.

17. The ultrasonic electromechanical stator according to claim 11, wherein at least one of said link connecting portions comprises a material that is less rigid than materials of said main parts of said link member and said vibrating bodies.

18. The ultrasonic electromechanical stator according to claim 1, wherein each of said vibration bodies comprises an assembly of a piezoelectric volume and a metal sheet, wherein said piezoelectric volume is attached to said metal sheet at at least two spatially separated positions, whereby a dimension change of said piezoelectric volume causes a bending of the assembly of said piezoelectric volume and said metal sheet.

19. The ultrasonic electromechanical stator according to claim 18, wherein a continuous metal sheet constitutes at least a part of said two vibrating bodies and at least a part of said link member.

20. The ultrasonic electromechanical stator according to claim 1, wherein an average thickness in said bending direction of said link member is larger than an average thickness in said bending direction of said vibrating bodies.

21. The ultrasonic electromechanical stator according to claim 1, wherein a length of each of said two vibrating bodies in said connection direction is at least 50% longer than a length of said link member in said connection direction.

22. An ultrasonic electromechanical motor, comprising:
the ultrasonic electromechanical stator according to claim 1;
a body to be moved arranged with a contact surface against said contact portion of said link member;
means for providing a normal force between said body to be moved and said ultrasonic electromechanical stator; and
a voltage supply configured to independently and controllably provide voltages to said two vibration bodies.

* * * * *